(12) United States Patent
Paquin et al.

(10) Patent No.: US 7,441,645 B2
(45) Date of Patent: Oct. 28, 2008

(54) ACCUMULATION TABLE

(75) Inventors: Claude G. Paquin, Naperville, IL (US); Daniel E. Brzeszkiewicz, Park Forest, IL (US)

(73) Assignee: Garvey Corporation, Blue Anchor, NJ (US)

( * ) Notice: Subject to any disclaimer, the term of this patent is extended or adjusted under 35 U.S.C. 154(b) by 0 days.

(21) Appl. No.: 11/821,834

(22) Filed: Jun. 25, 2007

(65) Prior Publication Data

US 2007/0251806 A1 Nov. 1, 2007

Related U.S. Application Data

(62) Division of application No. 11/026,363, filed on Dec. 29, 2004, now Pat. No. 7,252,186.

(51) Int. Cl.
*B65G 37/00* (2006.01)
*B65G 47/72* (2006.01)

(52) U.S. Cl. .............. 198/347.1; 198/447; 198/452; 198/580; 198/601

(58) Field of Classification Search .......... 198/347.1, 198/347.4, 452, 453, 443, 447, 580, 601, 198/606
See application file for complete search history.

(56) References Cited

U.S. PATENT DOCUMENTS

| | | | |
|---|---|---|---|
| 995,379 A | 6/1911 | Schwab | |
| 1,852,322 A | 4/1932 | Loew | |
| 2,303,755 A | 12/1942 | Newton | |
| 3,102,630 A | 9/1963 | Back | |
| 3,176,821 A | 4/1965 | Eldred et al. | |
| 3,232,411 A | 2/1966 | Kulig | |
| 3,339,700 A | 9/1967 | Wells | |
| 3,342,012 A | 9/1967 | Reading | |
| 3,604,551 A | 9/1971 | Fink | |
| 4,058,217 A | 11/1977 | Vaughan et al. | |
| 4,252,232 A | 2/1981 | Beck et al. | |
| 4,356,908 A | 11/1982 | Embro, Jr. | |
| 4,397,384 A | 8/1983 | Nohren, Jr. | |
| 4,401,207 A | 8/1983 | Garvey | |
| 4,446,670 A | 5/1984 | Compagnoni | |
| 4,690,751 A | 9/1987 | Umiker | |
| 5,079,896 A | 1/1992 | Langen et al. | |
| 5,348,061 A | 9/1994 | Riley et al. | |
| 5,372,238 A | 12/1994 | Bonnet | |

(Continued)

FOREIGN PATENT DOCUMENTS

EP 3773 A1 * 9/1979

(Continued)

*Primary Examiner*—Mark A Deuble
(74) *Attorney, Agent, or Firm*—Stuart M. Goldstein

(57) ABSTRACT

An accumulation table is disclosed. The accumulation table includes a frame, a first conveyor, a second conveyor, and an adjustable discharge chute. Each conveyor has a U-shaped product carrying section on the top of the frame and an arcuate return section located on the bottom of the frame. Some embodiments further include non-linear tracks located between two conveyor chains to direct one of the conveyor chains towards the adjustable discharge chute. The accumulation table can be formed with three or more aligned modular sections, two arcuate sections, and one or more intermediate, straight center sections. Tracks located on each section are aligned to form the complete accumulation table.

4 Claims, 16 Drawing Sheets

U.S. PATENT DOCUMENTS

| | | |
|---|---|---|
| 5,414,974 A | 5/1995 | Van de Ven et al. |
| 5,551,551 A * | 9/1996 | Crawford .................... 198/453 |
| 5,673,783 A | 10/1997 | Radant et al. |
| 5,769,204 A | 6/1998 | Okada et al. |
| 5,771,657 A | 6/1998 | Lasher et al. |
| 6,056,107 A | 5/2000 | Schuitema et al. |
| 6,076,683 A | 6/2000 | Okada et al. |
| 6,168,005 B1 | 1/2001 | Petrovic |
| 6,206,174 B1 * | 3/2001 | Koltz ........................ 198/444 |
| 6,401,936 B1 | 6/2002 | Isaacs et al. |
| 6,412,621 B1 | 7/2002 | De Vree et al. |
| 6,575,287 B2 | 6/2003 | Garvey et al. |
| 6,612,417 B2 | 9/2003 | Garvey |
| 6,612,425 B1 * | 9/2003 | Garvey ....................... 198/839 |
| 6,648,124 B1 | 11/2003 | Garvey |
| 6,964,329 B1 * | 11/2005 | DiBianca et al. ............ 198/443 |
| 7,252,186 B2 * | 8/2007 | Paquin et al. ............ 198/347.4 |
| 2005/0167239 A1 | 8/2005 | Tarlton |

FOREIGN PATENT DOCUMENTS

| | | |
|---|---|---|
| EP | 329210 A1 * | 8/1989 |

* cited by examiner

ACCUMULATION TABLE

CROSS-REFERENCE TO RELATED APPLICATIONS

This is a divisional application of parent application Ser. No. 11/026,363 filed Dec. 29,2004, now U.S. Pat. No 7,252,186.

BACKGROUND OF THE INVENTION

1. Field of the Invention

The present invention relates to accumulation tables and, more particularly, to dynamic accumulation tables.

2. Related Art

A production line, such as a packaging line, is a series of machines. If the production line is designed without accumulation, the entire system would stop each time any piece of equipment stops. For example, if a machine is stopped for maintenance, then a production line without accumulation would require a complete shutdown of the entire line. Further, one machine may operate at a different speed from another. Without a means to compensate for the difference in operating speeds, machines would have to be turned on and off to adjust for the difference in cycle times. Therefore, accumulation greatly increases system efficiency and profitability.

Accumulation in the packaging industry is defined as having a reserve of containers between consecutive machines or a reserve of space to accumulate containers to provide for the inevitable machine stops. Accumulation is generally achieved with conveyors or with accumulation tables. The population, or density, of containers upstream and downstream of any machine, combined with the speed of each machine determines the amount of accumulation required.

In general, dynamic accumulation is accomplished through conveyors located between machines. Usually, a specified number of conveyors having a preconfigured width and speed are used for a given population rate. This approach requires large amounts of floor space and care must be used to control line pressure as the containers accumulate on the conveyors. Line pressure as understood in the packaging industry means the pressure placed on each container on the conveyor resulting from a large number of containers being forced together in a small area. If the number of containers entering the conveyor increases without simultaneously increasing the number of containers exiting the conveyor, line pressure results as the containers are forced against one another. Excessive line pressure can lead to scuffing of container labels and even breakage of some containers.

Another accumulation device is the bi-flow table. A bi-flow table has conveyor chains that run in opposite directions to re-circulate the containers. This approach has its limitations due to the noise and label damage generated by container-to-container contact during the re-circulating process.

Lastly, a loop system utilizes conveyors arranged in a loop configuration to re-circulate the containers and provide accumulation. In this system the containers that are not required by the downstream machine are sent on the re-circulating loop and merge again with the flow of incoming containers. A particular drawback of the loop system is that it is not easily reconfigured. For example, if greater accumulation is required, the loop system cannot easily be expanded. Further, most loop systems utilize a single continuous looped conveyor chain. Because there is only a single conveyor chain, containers must enter and leave the loop system at the same speed. In other words, containers maintain a constant speed on the loop system. Because the containers maintain a constant speed, it is not possible to have containers exit the loop system faster than containers enter, or vice versa.

Most loop systems have a gate adjacent the discharge area. The gate is used to prevent discharge and force the containers into an accumulation area. A problem associated with typical gates is that usually one or more containers in transmit within the discharge area of the table when the gate begins to close. Therefore, most conventional systems will encounter some jams from time to time due to having a container stuck between a flow separator and the gate. The common solution to this problem is to move the gate rapidly and attempt to close the gate between two containers. However, this can cause containers to become unstable and fall, thus causing even more jams.

Accumulation tables offer a more efficient alternative in terms of floor space utilization. However, typical accumulation tables have the same constraints as the conveyor systems with regards to line pressure, the inability to handle tapered containers, and a requirement to single-file the containers separately from the accumulation device. Further, most accumulation tables utilize custom components which increases costs of production and maintenance.

Further, most accumulation tables and the majority of loop systems lack adequate space to clean underneath the product conveying chains. As such, chain conveyor wear strips are difficult, if not impossible, to adequately clean.

Additionally, most accumulation tables lack a mounting space for the gate. Typically, a complex structure is attached to the sides or bottom of the accumulation table for mounting the gate above the conveyor chains of the accumulation table. In other words, the gate must be hung above the conveyor chains. This type of mounting is inherently weak and expensive.

There remains a need in the art for an accumulation table that provides for low pressure dynamic accumulation. Further, there remains a need in the art for an accumulation table that is scalable and which may operate at different container entry and exit speeds. Additionally, there remains a need in the art for an accumulation table that provides clearance for cleaning the conveyor chains, track sections, and associated wear strips. Finally, there remains a continuing need in the art to reduce the costs associated with the production and maintenance of accumulation tables.

SUMMARY OF THE INVENTION

The invention is an accumulation table having two independent conveyors. The accumulation table is used to move and accumulate containers. Each conveyor has a U-shaped product carrying section. The U-shaped product carrying sections are nested together such that the straight sections of each "U" are contiguous with one another. Further, adjacent portions of the U-shaped product carrying sections are capable of carrying containers in the same direction. In this manner, the U-shaped product carrying sections cooperate to move the containers. With the assistance of guide rails, the two independent conveyors can move containers from a feed side to a discharge side or accumulate containers for later discharge.

The speed of each conveyor is independently adjustable. As such, the conveyors may move containers at the same speed or one conveyor may move containers at a faster rate than the other. This is significant because the difference in speeds allows for "catching up" the production line. For example, if a machine on the discharge side is down temporarily for maintenance, containers will accumulate on the accumulation table. Once the machine is again placed in operation, the conveyor on the discharge side of the accumulation table can be accelerated such that containers are discharged faster than containers are fed onto the accumulation table. As such, the production line can be "caught up" without stopping a machine on the feed side of the accumulation table.

Each conveyor is formed by parallel track sections and conveyor chains that ride between adjacent track sections. The track sections are mounted to a frame of the accumulation table. Spacers may be used to mount the track sections at a height above the frame. Further, removeable wear strips may be placed between the track sections and the conveyor chains. The wear strip is used to prevent wear to the track section or the conveyor chain.

Generally, the track sections conform to the shape of the frame. As examples, the track sections may be straight to correspond to a straight portion of the frame, or the track sections can be arcuate to correspond to an arcuate section of the frame. However, the track sections also can be designed to "split" apart the conveyor chains. Put another way, the track sections can be designed such that adjacent conveyor chains are directed away from one another. Splitting the conveyor chains provides two functions. First, splitting the conveyor chains create spaces or gaps between the conveyor chains. The gaps can be used for mounting items to the top of the accumulation table. As examples, a guide rail, a discharge chute, or a gate may be mounted to the top of the bed frame at the gaps. In some embodiments, a plug is inserted into the gap to maintain a plane of the first conveyor or the second conveyor. Additionally, items may be mounted to the plug.

Second, splitting the conveyor chains slightly redirects the conveyor chains such that containers on the accumulation table are separated. For example, two containers traveling next to one another on adjacent conveyor chains will separate as the containers encounter the "split" area next to the discharge chute. The separation between the two containers is used to direct one container towards a re-circulation area and the other container towards the discharge chute. As such, one conveyor chain carries one of the containers into the discharge chute while the other conveyor chain carries the other container to the re-circulation area. By changing the direction of the moving container, but not the speed, an incredibly stable transfer from the accumulation area to the discharge area is achieved.

The accumulation table is modular. The accumulation table is formed by assembling at least three modules. A first module provides the center of the accumulation table and the straight sections of the "U." A second module which is arcuate, or C-shaped, connects to a first end of the first module. A third module which is arcuate, or C-shaped, is attached to a second end of the first module and opposite the second module. Because the accumulation table is modular, it can easily be broken down for shipping. Moreover, the modular accumulation table may easily be expanded. In other words, the accumulation table is scalable. For example, if a production line requires greater accumulation of containers, the present invention can easily be modified to expand its capacity. To expand the accumulation table, one or more straight modules similar to the first module are inserted between the first module and the second module or the first module and the third module. Inserting additional modules will extend the length of the accumulation. The greater the length of the accumulation table, the greater its capacity to accumulate containers. In this manner, an existing accumulation table may be expanded without significant expense or effort.

The accumulation table includes an adjustable discharge chute. Containers are discharged through the discharge chute. The needs of a production line may vary, and production lines do not always manipulate the same containers. Sometimes the production lines have runs of differently sized product containers. Therefore, the accumulation table has an adjustable discharge chute to accommodate runs of differently sized containers. In general, a worker will adjust the width of the discharge chute for a particular container before a run begins. When the run is completed and before a new run begins, the worker will readjust the width of the discharge chute, if necessary.

The adjustable discharge chute has a sliding member which is moved to adjust the width of the discharge chute. The sliding member has several preconfigured slots. The sliding member slides along the slots to maintain a proper orientation. The worker loosens a clamp, slides the sliding member to the appropriate width for a particular container, and re-locks the clamp. As an example, the clamp may be a hand knob mounted on a threaded rod.

The accumulation table also includes a dual member gate for each discharge chute. If the containers have to be re-circulated due to a downstream stop, the first gate member is closed. The movement of the first gate member follows the direction of travel of the containers and travels essentially at the same speed as the containers. In this manner, the containers are gently diverted onto the re-circulation area of the accumulation table. After the first gate member has been closed, a second gate member is activated and slides in a direction opposite of the first gate member. Once the second gate member is in place, the first gate member is retracted. The containers continue to be re-circulated so long as the second gate member is in place. Once the downstream operation is back in production, the second gate member is opened. The movement of the second gate member follows the direction of travel of the containers and travels essentially at the same speed as the containers. As such, the containers in contact with the second gate member continue onto the re-circulation area of the accumulation table and the following containers will be free to enter the discharge path without causing container instability or down containers.

Finally, the accumulation table allows for end discharge and end feeding in addition to side discharging or feeding. The configuration of the two independent conveyors conveniently provides for the possibility of end discharging, end feeding, side discharging, side feeding, or some combination thereof.

Further areas of applicability of the present invention will become apparent from the detailed description provided hereinafter. It should be understood that the detailed description and specific examples, while indicating the preferred embodiment of the invention, are intended or purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
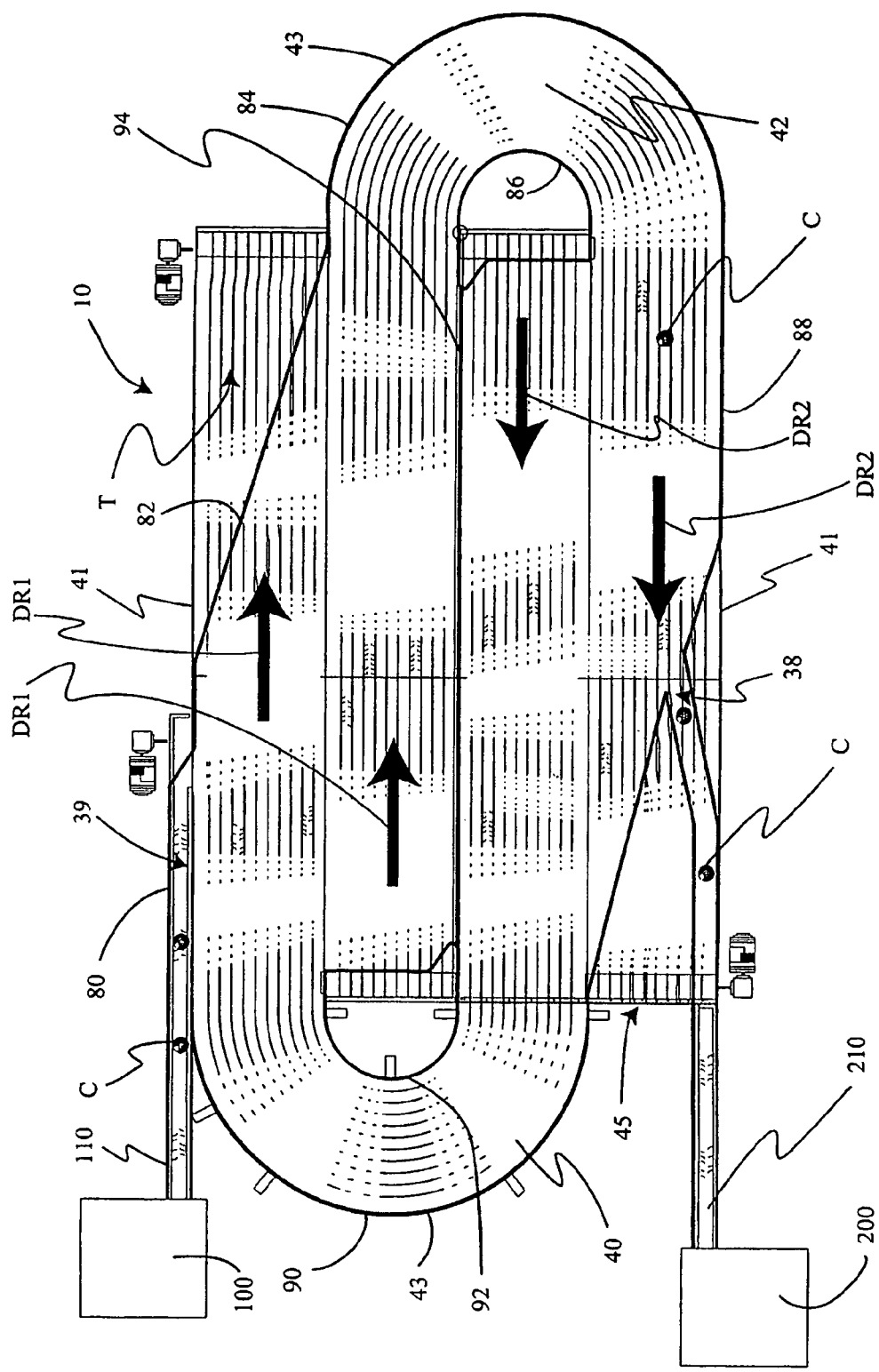
FIG. 1 is a top view of the accumulation table.

FIG. 1 illustrates an accumulation table In the depicted embodiment, the accumulation table 10 is connected to an upstream machine 100 and a downstream machine 200. A container C, such as a bottle, moves from the upstream machine 100 on an upstream conveyor 110 onto the accumulation table 10. The accumulation table 10 has a top, or product carrying side, T and a bottom, or return side, B (best seen in FIG. 7) opposite of the top T. The containers C move along the top of the accumulation table 10. The containers C can have any number of shapes, sizes, and rigidity. As examples, the container C may be a metal can, a glass bottle, a plastic bottle, or a non-round container. The container C moves around the accumulation table 10 and is discharged through a discharge chute 38 onto a downstream conveyor 210 to the downstream machine 200. While in the depicted embodiment only one discharge chute 38 is shown, those skilled in the art would understand that the accumulation table 10 may have multiple discharge chutes. Further, while in the depicted embodiments only one conveyor feeds the accumulation table 10, those skilled in the art would understand that the accumulation table 10 may have multiple feed conveyors. As such, the accumulation table 10 may have both multiple feed conveyors and multiple discharge chutes.

The accumulation table 10 acts as a buffer. In other words, the accumulation table 10 allows for the continuous operation of the upstream machine 100 and the downstream machine 200 even if one of the machines 100, 200 is malfunctioning or has temporarily ceased operation, such as for maintenance. For example, if the downstream machine 200 is inoperative, the upstream machine 100 may continue to operate and the containers C will merely accumulate, or re-circulate, on the accumulation table 10.

The accumulation table 10 includes a first conveyor 40 and a second conveyor 42. The first conveyor 40 and the second conveyor 42 are nested together. The configuration of the first conveyor 40 and the second conveyor 42 provide continuous movement of the containers C. Each conveyor 40, 42 has two straight sections 41, an arcuate product carrying section 43 on the product carrying side, and an arcuate return section 44 (best seen in FIG. 6) which is located underneath on the bottom side of the accumulation table 10. As an example, the product carrying section 43 and the return section 44 may be C-shaped. Because the arcuate return sections 44 are located on the bottom B of the accumulation table 10, the conveyors 40, 42 appear U-shaped when viewed from above. Therefore, it may be said that each conveyor 40, 42 has a U-shaped product carrying section comprised of the straight sections 41 and the arcuate section 43.

Contiguous straight sections 41 of each conveyor 40, 42 carry containers C in the same direction. As an example, one set of straight sections 41 may travel in a first direction DR1, while the other set of straight sections 41 travel in a second direction DR2. In this manner, the U-shaped product carrying sections cooperate to move the containers C. With the assistance of guide rails 80-94, the two independent conveyors 40, 42 can move containers C from the upstream conveyor 110 to the downstream conveyor 210 or accumulate containers C for later discharge.

Figure 5:
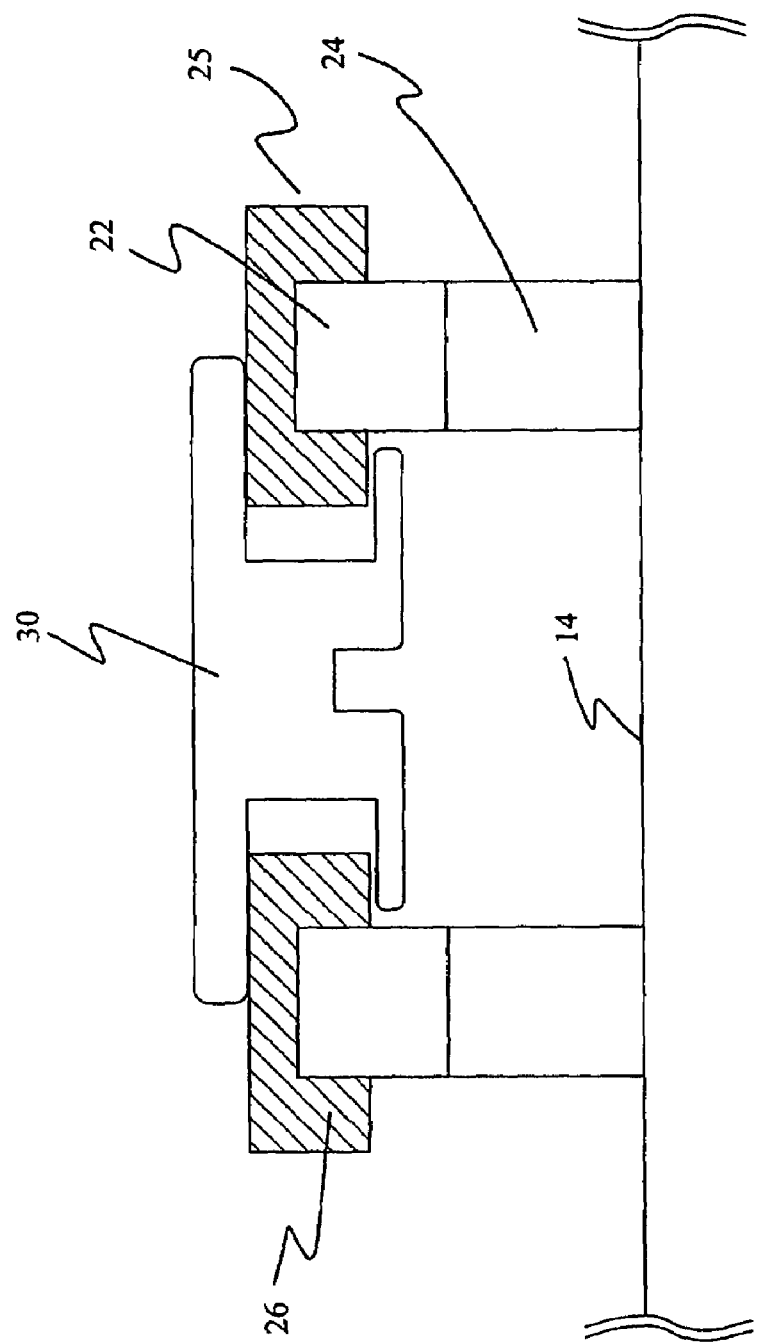
FIG. 5 is a sectional view illustrating the conveyor chain.

In the depicted embodiment of FIG. 1, the upstream conveyor 110 feeds containers C along a first side 39 of the first conveyor 40, whereas containers C are discharged at an end section 45 into the downstream conveyor 210. Note that the downstream conveyor 210 is directly in-line with one of the straight sections 41 of the second conveyor 42. While the embodiment depicted in FIG. 1 utilizes side feeding and end discharging, other configurations are possible. For example, containers C may be fed on the accumulation table 10 or discharged therefrom on the side or at an end section. Further, as best illustrated in FIG. 5, containers C may be both fed and discharged on the same side. Alternatively, containers C may be both fed and discharged at end sections.

The speed of each conveyor 40, 42 is independently adjustable. As such, the conveyors 40, 42 may move containers C at the same speed or one conveyor may move containers C at a faster rate than the other. This is significant because the difference in speeds allows for "catching up" the production line. For example, if the downstream machine 200 is down temporarily for maintenance, containers C will accumulate or re-circulate on the accumulation table 10. Once the downstream machine 200 is again placed in operation, the second conveyor 42 on the discharge side of the accumulation table 10 can be accelerated such that containers C are discharged faster than containers C are fed onto the accumulation table 10. As such, the production line can be "caught up" without stopping the upstream 100 on the feed side of the accumulation table 10. During normal operation, however, the first conveyor 40 travels at the same speed as the upstream conveyor 110, and the second conveyor 42 travels at the same speed as the downstream conveyor 210.

The accumulation table 10 further includes guide rails 80-94. The guide rails 80-94 direct the containers C. The guide rails 80-94 must be configured for the particular arrangement of the accumulation table 10 and may change depending upon the requirements of the production line. In the embodiment depicted in FIG. 1, there is a first guide rail 80, a second guide rail 82, a third guide rail 84, a fourth guide rail 86, a fifth guide rail 88, a sixth guide rail 90, a seventh guide rail 92, and an eighth guide rail 94. The first guide rail 80 directs containers C from the upstream conveyor 110 onto the first conveyor 40. The second guide rail 82 directs containers C from the first conveyor 40 to the second conveyor 42. The third guide rail 84 is along an exterior edge of the arcuate product carrying section 43 of the second conveyor 42. The fourth guide rail 86 is along an interior edge of the arcuate product carrying section 43 of the second conveyor 42. The fifth guide rail 88 extends from the third guide rail 84 along the straight section 41 of the second conveyor 42 and to the discharge chute 38. The sixth guide rail 90 is along an exterior edge of the arcuate product carrying section 43 of the first conveyor 40. The seventh guide rail 92 is along an interior edge of the arcuate product carrying section 43 of the first conveyor 40. The eighth guide rail 94 extends between the fourth guide rail 86 and the seventh guide rail 92 to split the accumulation table 10.

Figure 2:
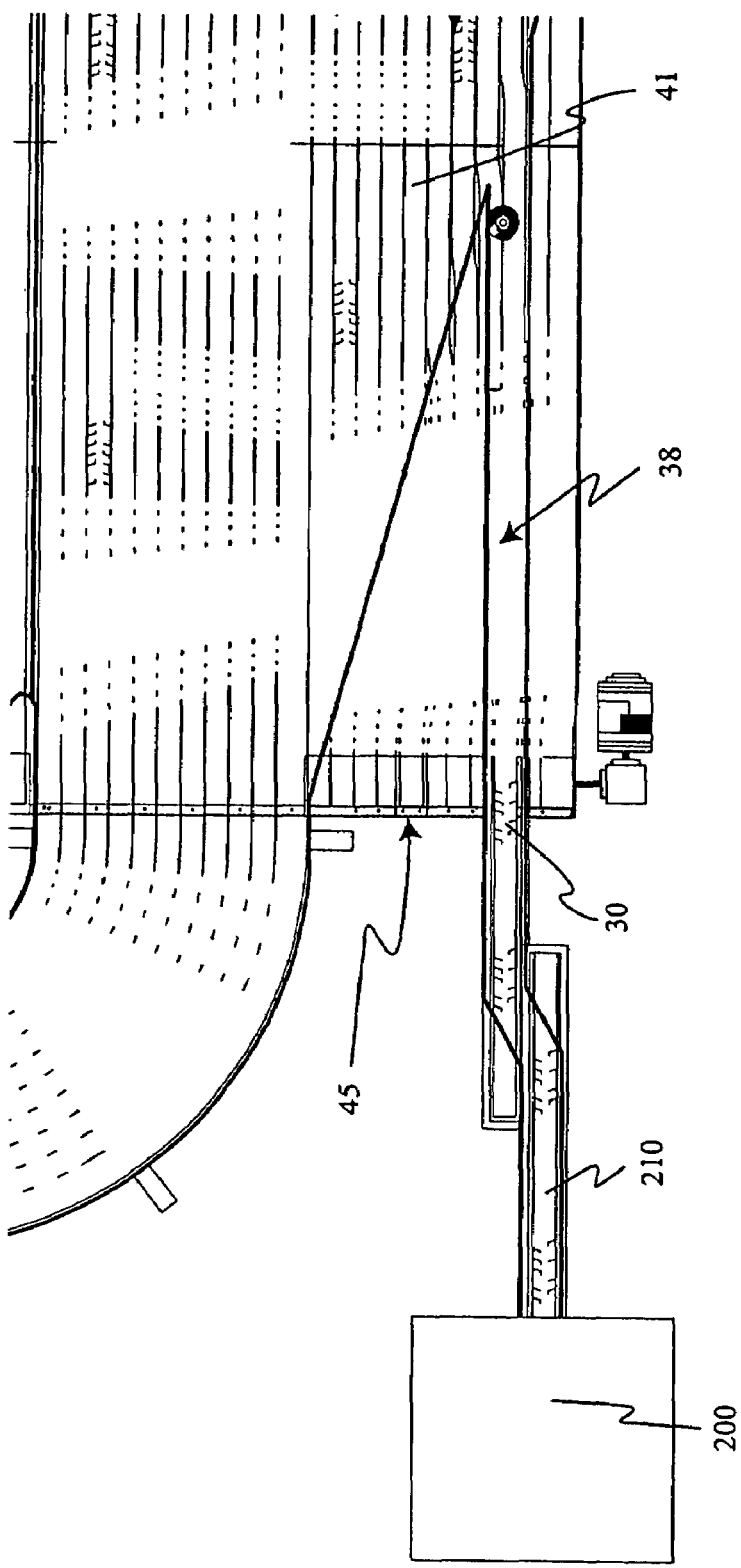
FIG. 2 is a top view of the downstream conveyor in an alternative configuration.

FIG. 2 illustrates an alternative configuration of the discharge chute 38 and the downstream conveyor 210. In the embodiment depicted in FIG. 2, the discharge chute 38 is longitudinally aligned with the conveyors 30 of the straight section 41. One of the conveyor chains 30 and the discharge chute 38 are extended slightly beyond the end section 45. The downstream conveyor 210 is aligned next to the discharge chute 38. As such, containers C may travel on the straight section 41, enter the discharge chute 38, and make a side transfer onto the downstream conveyor 210. Thereafter, the downstream conveyor 210 carries the containers C to the downstream machine 200.

Figure 3:
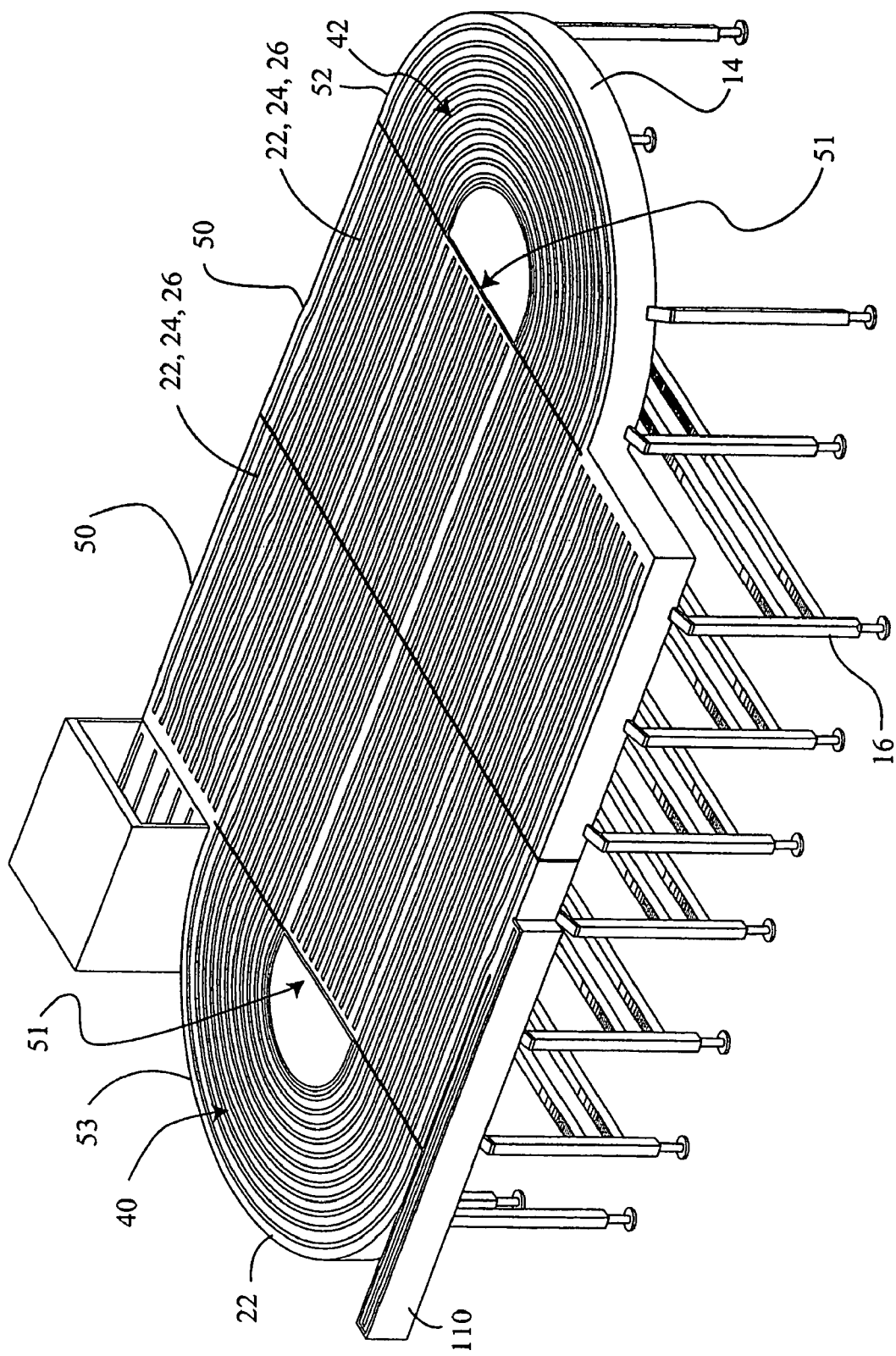
FIG. 3 is a perspective view of the partially assembled accumulation table.

FIG. 3 illustrates a modular design of the accumulation table 10. In the depicted embodiment, the accumulation table 10 is formed by assembling four modules. However, those skilled in the art will understand that a greater or lesser number of modules may be used. First modules 50 provide a center section of the accumulation table 10 and the straight sections 41 of the first conveyor 40 and the second conveyor 42. A second module 52 which is arcuate, or C-shaped, connects to an end 51 of the first module 50. A third module 53 which is arcuate, or C-shaped, is attached to an end 51 of the first module 50 and opposite the second module 52. Because the accumulation table 10 is modular, it can easily be broken down for shipping.

Moreover, the modular accumulation table 10 may easily be expanded. In other words, the accumulation table 10 is scalable. For example, if a production line requires greater accumulation of containers C, the present invention can easily be modified to expand its capacity. To expand the accumulation table 10, one or more first modules 50 are inserted between the first module 50 and the second module 52 or the first module 50 and the third module 53. Inserting additional modules will extend the length of the accumulation table 10. The greater the length of the accumulation table 10, the greater its capacity to accumulate containers C. However, a longer accumulation table 10 will require additional floor space. In this manner, an existing accumulation table may be expanded without significant expense or effort.

Figure 4:
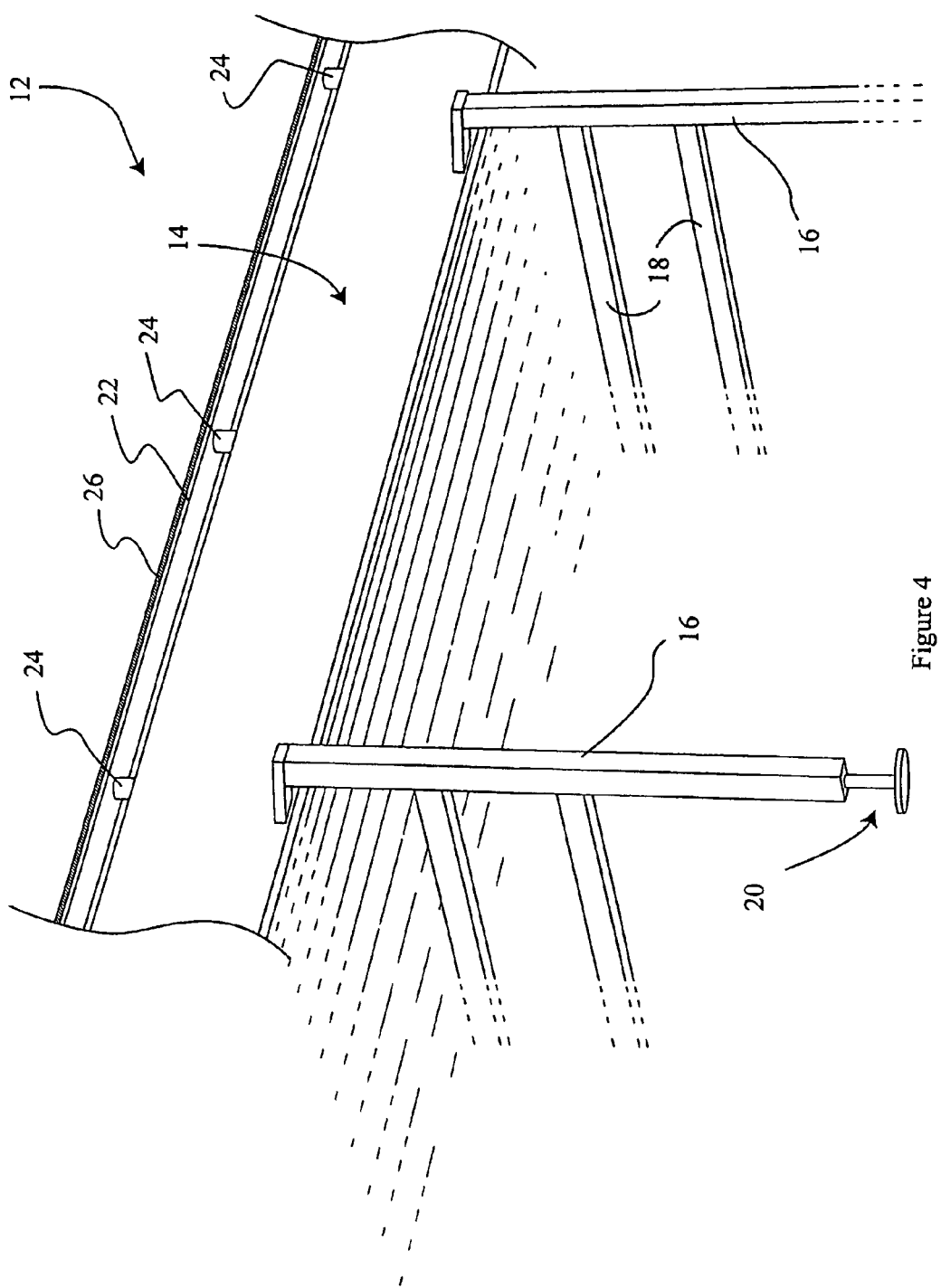
FIG. 4 is a detailed perspective view of the frame of the accumulation table.

FIG. 4 illustrates a frame 12 of the accumulation table 10. The frame 12 includes a bed 14. In the depicted embodiment, the bed 14 is six inches (152 mm) deep. A plurality of legs 16 are connected to the bed 14. The height of the accumulation table depends upon the length of the legs 16. Generally, the legs 16 are sized according to the accompanying machines of the production line. In the depicted embodiment, the legs 16 are approximately three feet in length. Cross members 18 interconnect legs 16 to provide additional stability. In the depicted embodiment, adjustable feet 20 are connected to the legs 16. The adjustable feet 20 may be vertically adjusted to level the accumulation table 10 or to provide a discrete height adjustment for the accumulation table 10.

A plurality of spacers 24 are connected to the top of the bed 14. The spacers 24 vary in height from approximately one-half of an inch (12 mm) to approximately one and one-half inches (38 mm). In the depicted embodiments, the spacers 24 are ⅝ of an inch (16 mm). The spacers 24 may have any of various shapes but in the depicted embodiment the spacers 24 are cylindrical.

As best seen in FIG. 5, a track section 22 is mounted on the spacers 24. A wear plate or strip 26 is mounted to the track 22. In some embodiments, the wear strip 26 has lips 25 on each side of the track 22 to prevent lateral movement of the wear strip 26. As its name implies, the wear strip 26 is subject to wear and may be removed and replaced as necessary. The spacers 24 space the track 22 above the bed 14 such that it is possible to clean underneath the conveyors 40, 42. Because the accumulation table 10 is often used in the food and beverage industry, the bed 14, the legs 16, the cross members 18, the spacers 24, and the track 22 are all preferably made of stainless steel. Moreover, the wear strip 26 is made from Ultra-High Molecular Weight (UHMW) Plastic. A conveyor chain 30 rides on the wear strip 26 and in between adjacent parallel tracks 22.

The track 22 and the wear strips 26 are sized according to the size of the conveyor chain 30. The width of the track 22 ranges from approximately one-half of an inch (12 mm) to approximately one and one-half inches (38 mm). The width of the wear strip 26 ranges from approximately one inch (25 mm) to approximately two and one-half inches (64 mm). As examples, if the conveying chain 30 is three and one-quarter inches (83 mm) wide, then the track 22 is three-fourths of an inch (19 mm) wide and the wear strip 26 is one and one-half inches (38 mm) wide, but if the conveying chain 30 is four and on-half inches (114 mm) wide, then the track 22 is one inch (25 mm) wide and the wear strip 26 is 2 and one-eighth inches (54 mm) wide.

Referring once again to FIG. 3, each modular section 50, 52, 53 may have the tracks 22, the spacers 24, and the wear strips 26 installed prior to assembly of the modules. In that case, the modules 50, 52, 53 would be placed in their respective positions and adjusted such that the tracks 22/wear strips 26 are aligned with one another. Then, the modules 50, 52, 53 would be assembled together, such as by fastening. Note that the track sections 22 generally conform to the shape of the frame 12. As examples, the track sections may be straight to correspond to a straight portion of the frame, or the track sections can be arcuate to correspond to an arcuate section of the frame.

Figure 6:
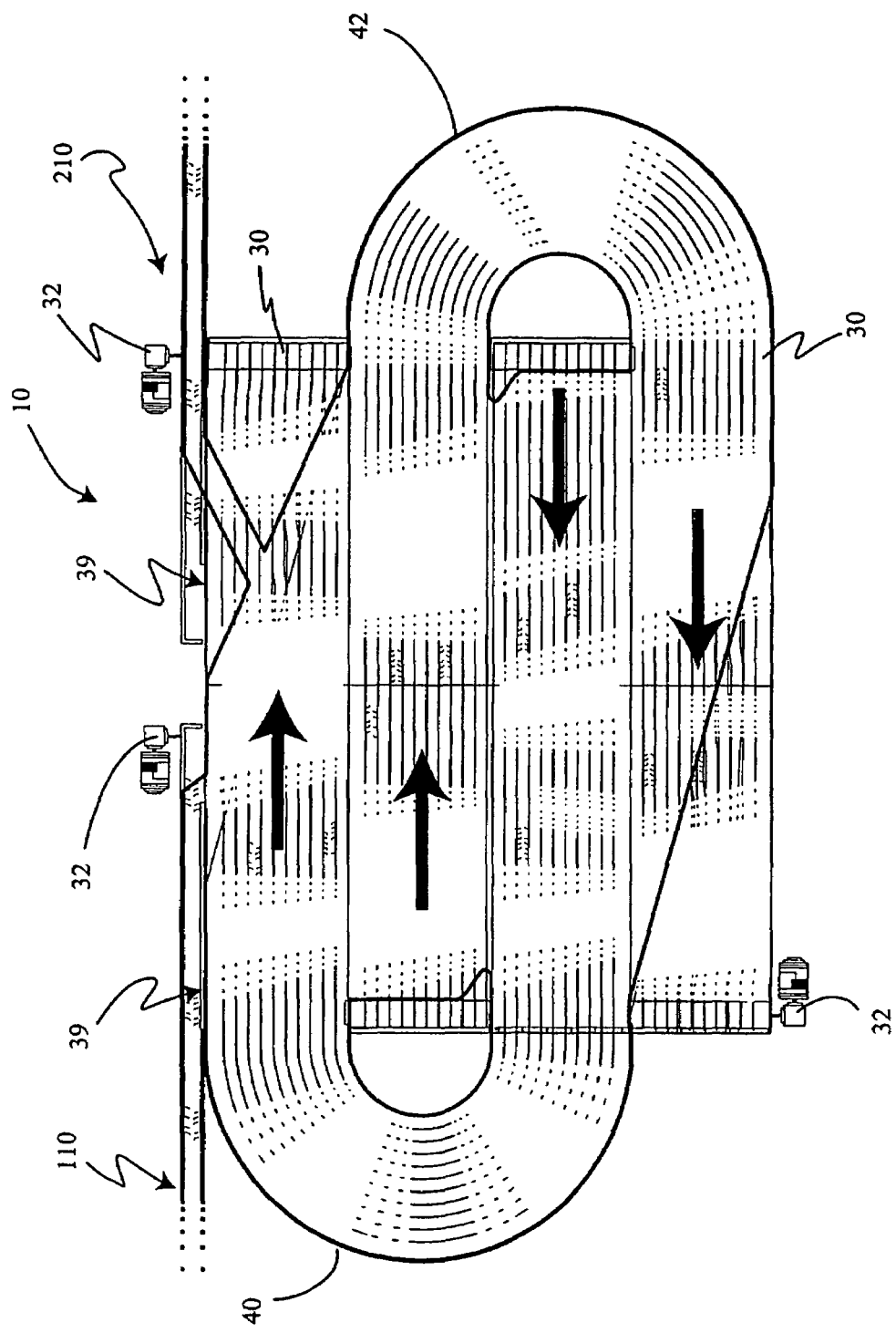
FIG. 6 is a top view of an alternate embodiment of the accumulation table.

FIG. 6 illustrates an alternative configuration of the upstream conveyor 110 and the downstream conveyor 210. In the embodiment depicted in FIG. 6, the upstream conveyor 110 is connected to the side 39 of the first conveyor 40, and the downstream conveyor 210 is also connected to the side 39 of the first conveyor 40. In contrast to the embodiment depicted in FIG. 1, this embodiment utilizes a side feed and a side discharge. Those skilled in the art will understand that the accumulation table 10 may have an end feed, an end discharge, a side feed, a side discharge, or some combination thereof.

Each conveyor 40, 42 includes several rows of conveyor chains 30. In the depicted embodiment, each conveyor 40, 42 has eleven rows of conveyor chains 30. However, those skilled in the art will understand that a greater or lesser number of conveyor chains could be used. For example, each conveyor 40, 42 may have as few as two conveyor chains or as many as sixteen conveyor chains. As such, the width of the accumulation table 10 may be varied by increasing or decreasing the total number of conveyor chains 30. Obviously, the greater the number of conveyor chains 30, the wider the accumulation table 10 will be and the more containers C the accumulation table 10 can accumulate and carry. However, the amount of floor space required for the accumulation table 10 is proportional to its width.

The conveyor chains 30 are standard items that available from many suppliers. As an example, the conveyor chains 30 may be purchased from Rexnord Industries, Inc., 4701 Greenfield Ave., Milwaukee, Wis. The conveyor chains 30 come in standard sizes. As examples, the conveyor chains 30 may be three and one-quarter inches (83 mm) wide or four and on-half inches (114 mm) wide.

The conveyor chains 30 are driven by drive sprockets 34 (best seen in FIG. 7) which are driven by a motor 32. In the depicted embodiment, there are three motors 32. One of the motors 32 drives the upstream conveyor 110, one of the motors 32 drives the second conveyor 42, and the other motor 32 drives both the first conveyor 41 and the downstream conveyor 210. As depicted in FIG. 6, each conveyor 40, 42, 110, 210 may have its own motor 32 to rotate the associated sprockets 34, or the motor 32 may simultaneously drive two or more conveyors.

Figure 7:
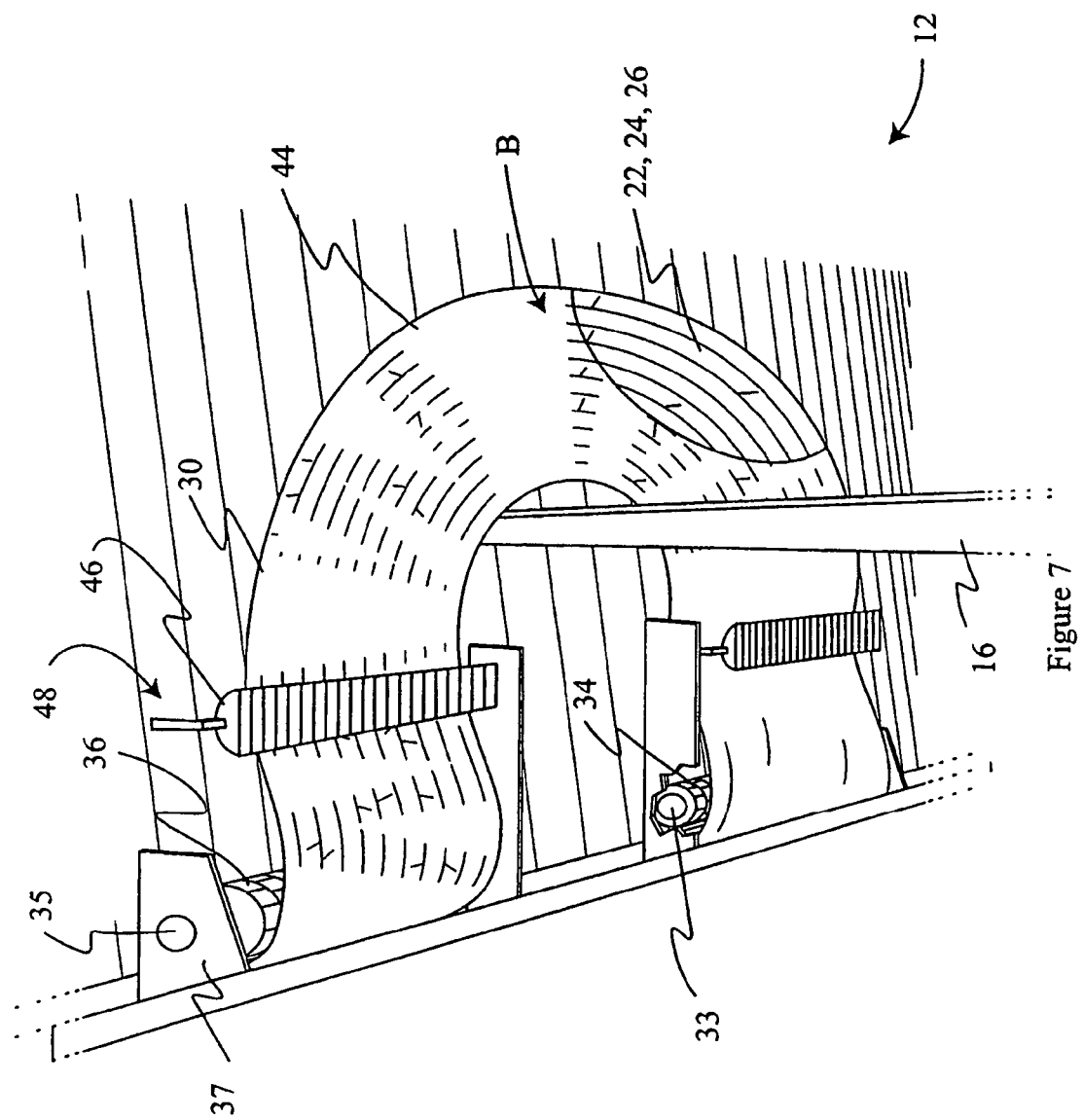
FIG. 7 is a bottom view of the accumulation table.

FIG. 7 illustrates the bottom B of the accumulation table 10. As noted above, each conveyor 40, 42 has the return section 44. The return section 44 completes the loop of the conveyor 40, 42 on the bottom B of the accumulation table 10. The return section 44 is supported by track sections 22 attached to the bottom B of the frame 12. The track sections 22 are spaced below the bottom B using spacers 24, and wear strips 26 are mounted on the track sections 22 in-between the conveyor chains 30. Because mounting the spacers 24, the track 22, and the wear strips 26 to the bottom B may be cumbersome, some embodiments instead may utilize a single track component having the same physical dimensions of all three components but made of UHMW plastic. In this manner, the parallel rows of the single track component provide the conveyor path for the conveyor chains 30.

The drive sprocket 34 drives each conveyor chain 30. An idler 36 cooperates with the drive sprocket 34. There is one drive sprocket 34 and one idler 36 for each row of conveyor chain 30. In the depicted embodiment, there are eleven drive sprockets 34 and eleven idlers 36. The drive sprockets 34 and the idlers 36 are mounted where the straight sections 41 of each conveyor 40, 42 meets the return section 44. The drive sprockets 34 are mounted on a first shaft 33, and the idlers 36 are mounted on a second shaft 35. The motor 32 rotates the drive sprockets 34 via the first shaft 33. The drive sprockets 34 are affixed to the first shaft 33 and rotate therewith. In some embodiments, the idlers 36 rotate about the second shaft 35. In the depicted embodiment, the idlers 36 are affixed to the second shaft and rotate therewith. The first shaft 33 is rotatably connected to the bed 14. In some embodiments, the second shaft 35 is rotatably connected to the bed 14 but is rigidly connected to the bed 14 in other embodiments. In the depicted embodiment, plates 37 are used to connect the shafts 33, 35 to the bed 14.

Return shoes 46 extends from the frame 12 by hangers 48. The return shoes 46 cooperate with the drive sprockets 34 and the idlers 36 to prevent jamming of the return section 44.

Figure 8:
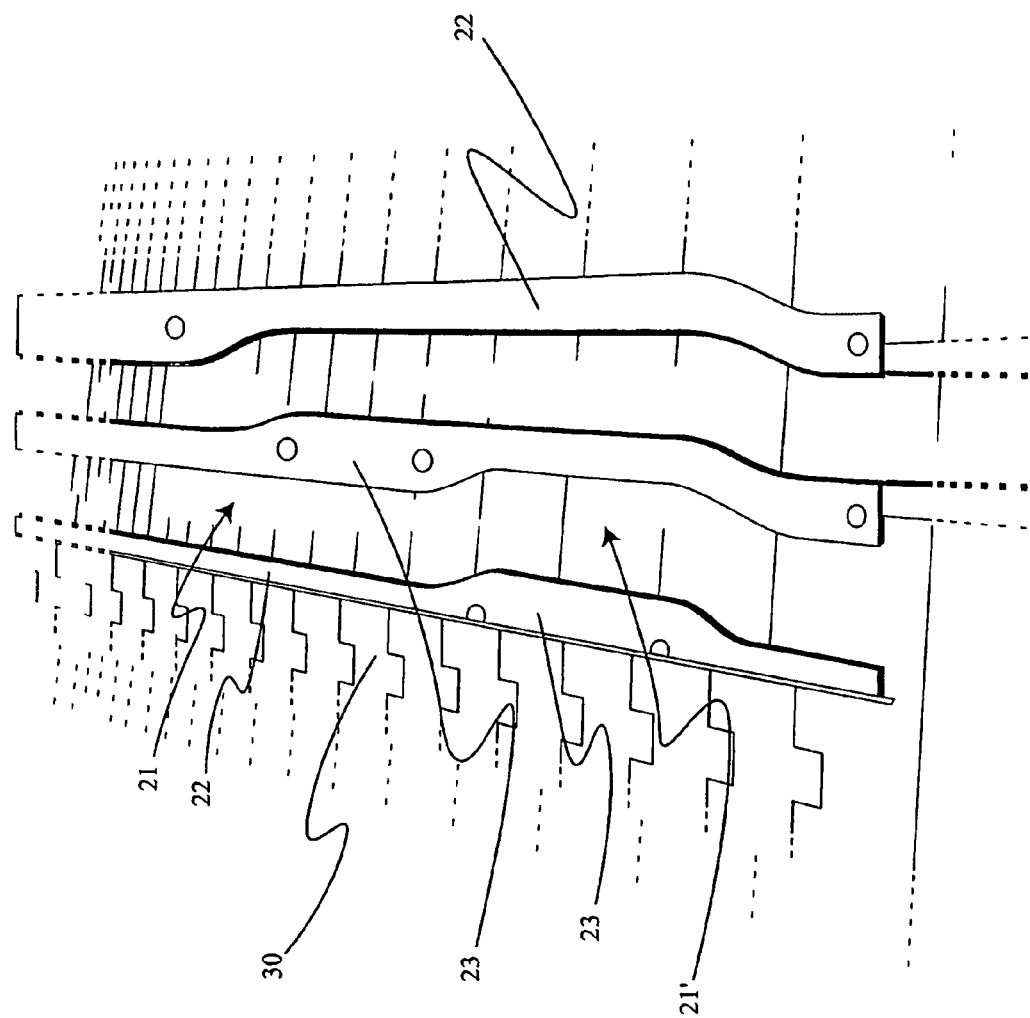
FIG. 8 is a perspective view illustrating the conveyor chain path.

As noted above, the track sections 22 generally conform to the shape of the frame 12. However, as best seen in FIG. 8, the track sections 22 can be designed to "split" apart the conveyor chains 30. Splitting the conveyor chains 30 provides two functions. First, splitting the conveyor chains 30 create spaces or gaps 58 (best seen in FIG. 9) between the conveyor chains 30. The gaps 58 can be used for mounting items to the top T of the accumulation table 10. As examples, a guide rail, a discharge chute, or a gate may be mounted to the top T of the bed 14 or the tracks 22 at the gaps 58.

Second, splitting the conveyor chains 30 slightly redirects the conveyor chains 30 such that containers C on the accumulation table 10 are separated. For example, two containers traveling next to one another on adjacent conveyor chains will separate as the containers encounter the "split" area next to the discharge chute 38. The separation between the two containers is used to direct one container towards a re-circulation area and the other container towards the discharge chute 38. As such, one conveyor chain carries one of the containers into the discharge chute 38 while the other conveyor chain carries the other container to the re-circulation area. By changing the direction of the moving container, but not the speed, an incredibly stable transfer from the accumulation area to the discharge chute 38 is achieved. Moreover, because the conveyor chain 30 within the discharge chute 38 maintains the distance between adjacent containers C, line pressure is significantly reduced or even eliminated.

A conveyor path 21 is provided by mounting rows of parallel track sections 22 to the top T of the bed 14. The conveyor chain 30 rides in the conveyor path 21 between adjacent track sections 22. In this manner, the conveyor path 21 follows the course provided by the parallel track sections 22. The width of the conveyor path 21 depends upon the size of the conveyor 30. In general, the width between adjacent track sections 22 ranges from approximately one inch (25 mm) to approximately three and one-half inches (89 mm). In the depicted embodiment, the width of the conveyor path 21 is one and three-fourths inches (44 mm) apart as measured from wear strip-to-wear strip.

Splitting the conveyor chains 30 is achieved by placing parallel non-linear tracks 23 in between longitudinally extending track sections 22. The non-linear track sections 23 are generally installed in pairs to alter the path of the conveyor chains 30. In the embodiment depicted in FIG. 8, the non-linear track sections 23 are S-shaped to provide an S-shaped conveyor path 21'. The non-linear track sections 23 are mounted to the spacers 24 in the same manner as the track sections 22.

In some embodiments, a plug 28 is inserted into the gap 58 to maintain a plane of the first conveyor 40 or the second conveyor 42. The plug 28 is secured to the track section 22 or the bed 14. The plug 28 is used to maintain an even conveying surface, which is necessary to prevent containers C from tipping over. In other words, without the plug 28, the container C would encounter the gap 58 and likely tip over. The plugs 28 may be made of UHMW plastic or stainless steel. In the case of UHMW plastic, some embodiments may include a stainless steel backing plate for extra rigidity. The thickness of the plug 28 is dependant on the size of the container C. The plug 28 has a thickness in the range of approximately one-eighth of an inch (3 mm) to approximately three-quarters of an inch (19 mm). In the depicted embodiment, the plugs 28 have a thickness of one-quarter of an inch (6 mm). Further, items may be mounted to the plug 28. Because the plug 28 is located next to the discharge chute and in-between conveyor chains the plug 28 provides a convenient mounting surface 49. As examples, a guide rail, a discharge chute, or a gate may be mounted to the plug 28.

Figure 9:
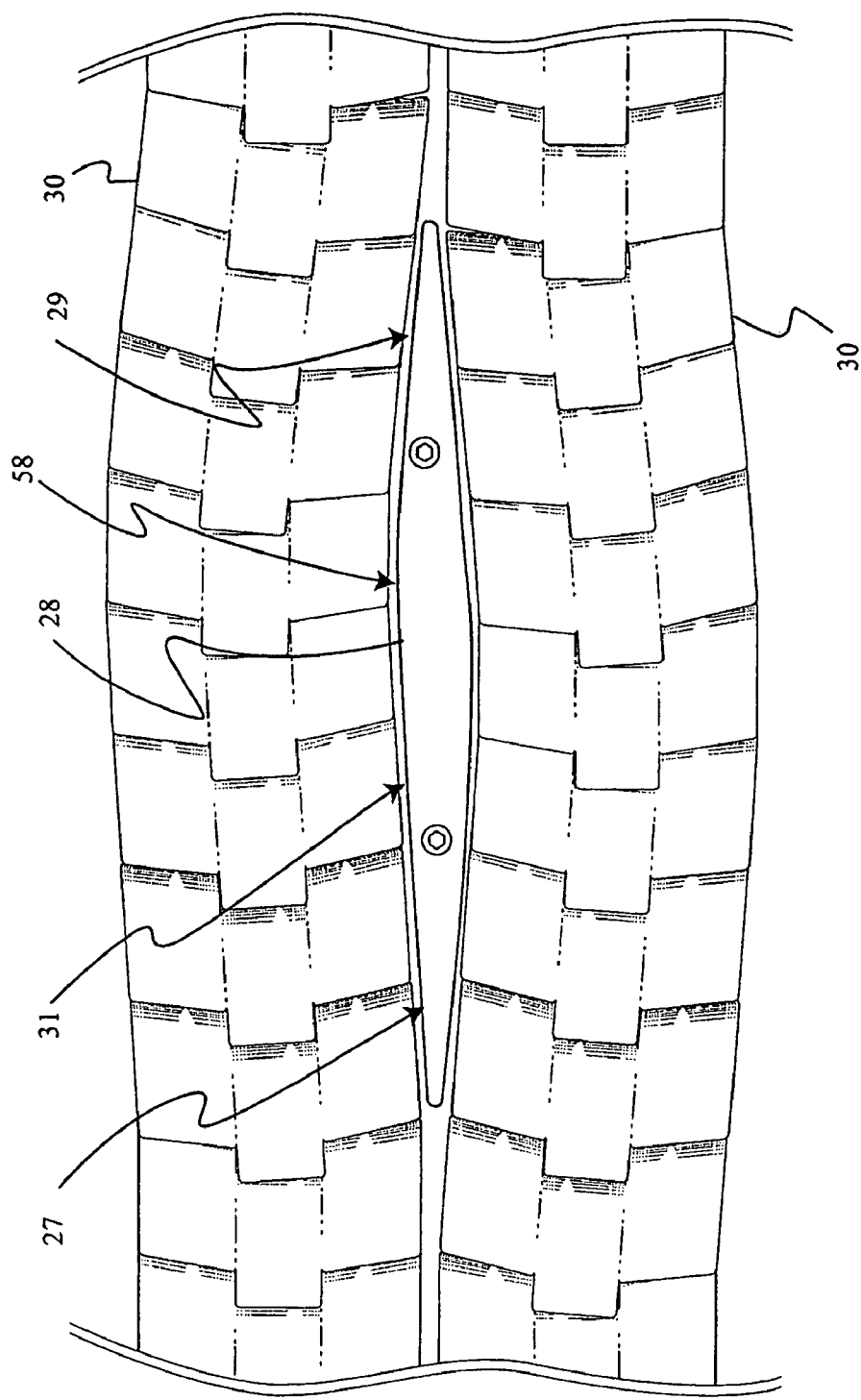
FIG. 9 is a detailed view of the plug.
Figure 10:
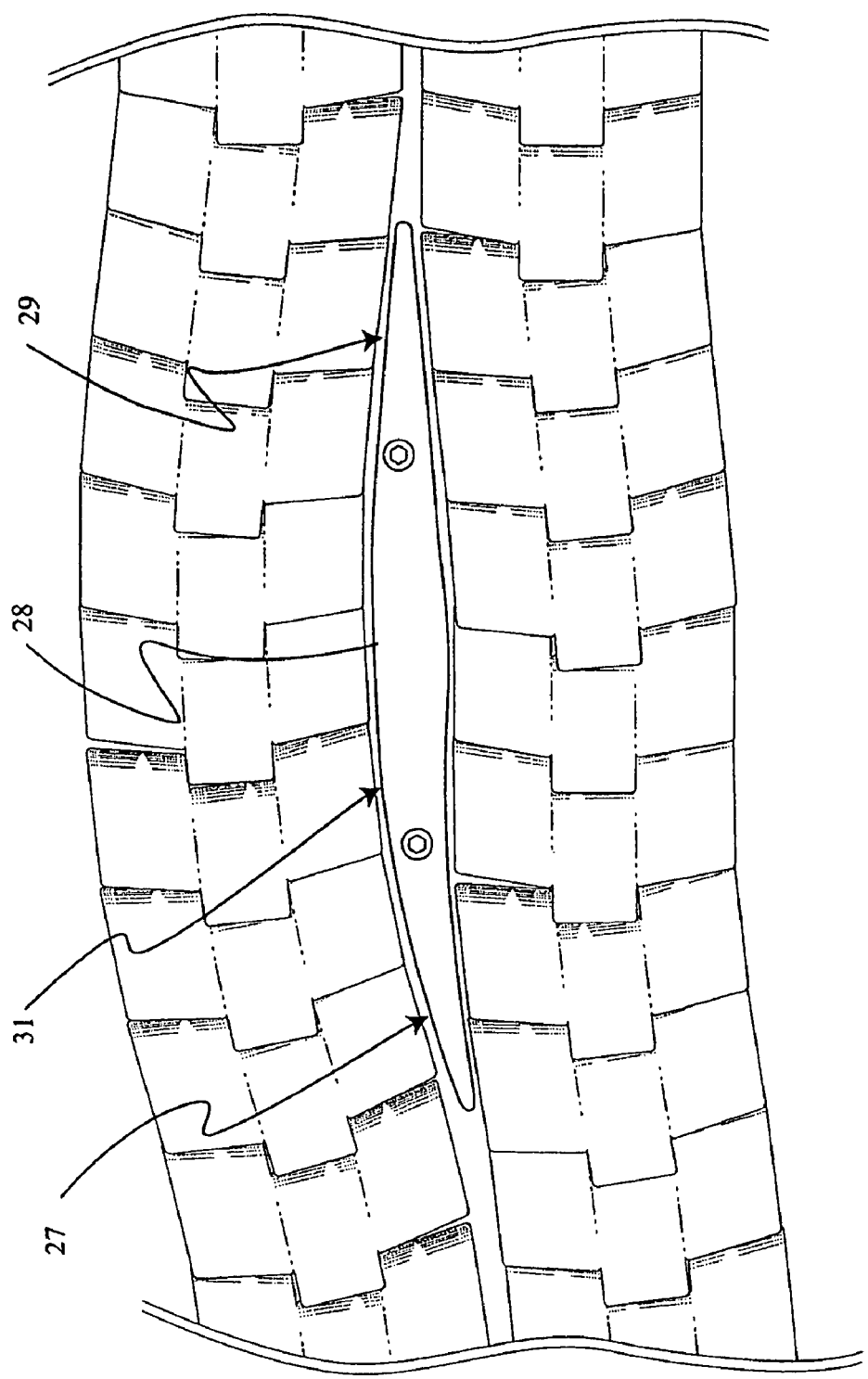
FIG. 10 is a detailed view illustrating an alternate embodiment of the plug.

FIG. 9 illustrates a detailed view of the plug 28. The plug 28 has an initial portion 27, a middle portion 31, and a tail end portion 29. In the depicted embodiment, the initial portion 27 and the tail portion 29 have a symmetrical taper. However, other shapes may be used. For example, the initial portion 27 may be straight while the tail portion 29 is arcuate, or vice versa. FIG. 10 illustrates an alternative embodiment having an arcuate initial portion 27.

Figure 11:
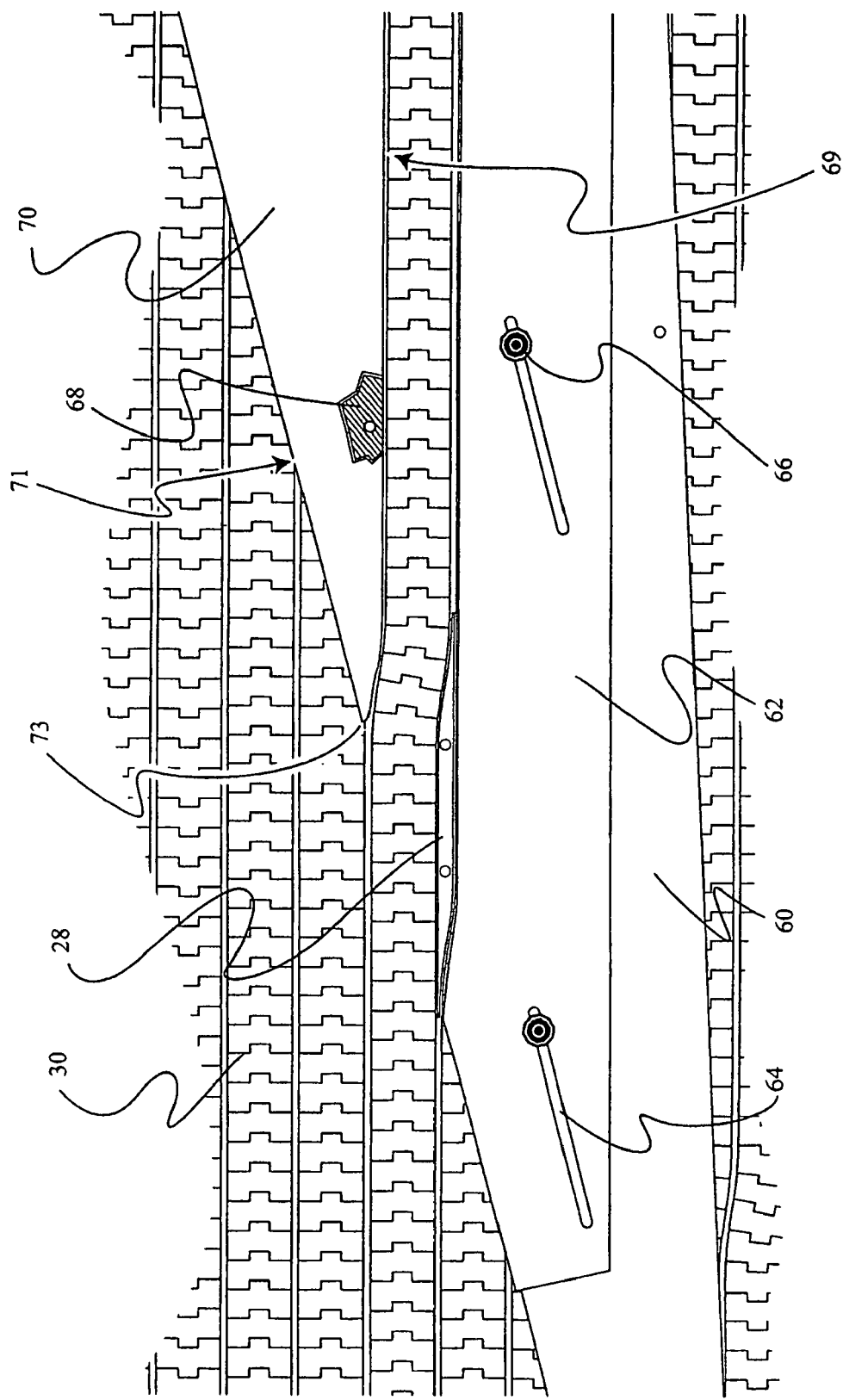
FIG. 11 is a top view of the discharge chute.

FIG. 11 illustrates a top view of the adjustable discharge chute 38. The discharge chute 38 is adjustable to accommodate differently sized containers C. Thus, as part of the initial set up of the accumulation table 10 a worker or user will place the container C in the discharge chute 38 and adjust the discharge chute 38 according to the size of the container C as part of the set up routine.

The discharge chute 38 includes a first guide 60 and adjustment member 62. The adjustment member 62, also referred to as a sliding member, is moved to adjust the width of the discharge chute 38. In general, the profile of the adjustment member 62 follows the layout of the conveyor chain 30. The adjustment member 62 has several preconfigured adjustment holes 64. In the depicted embodiment, the preconfigured adjustment holes 64 are slots; however, those skilled in the art will understand that a series of holes could equally be used. The adjustment member 62 slides along the slots 64 to maintain a proper orientation. The worker loosens a clamp 66, slides the adjustment member 62 to the appropriate width for a particular container, and re-locks the clamp 66. As an example, the clamp 66 may be a hand knob mounted on a threaded rod mounted on the bed 14.

The discharge chute 38 is formed by the first guide 60, the adjustment member 62, a second guide 68 and a third guide 70. The third guide 70 is mounted directly over the second guide 68. In the depicted embodiment, the discharge guides are made of UHMW plastic; however, other materials, such as stainless steel, may be used. Further, in some embodiments, the first guide 60, the second guide 68, and the third guide 70 may each have a stainless steel backing plate.

The second guide 68 and the third guide 70 each have a first face 69 and a second face 71. The first face 69 and the second face 71 converge to an edge 73. Containers C travel on the conveyor chains 30. When the containers C reach the edge 73, the containers C diverge and either travel along the first face 69 or the second face 71, depending upon which conveyor chain 30 the container C is riding along. For example, the container C may travel along the first face 69 and down the discharge chute 38, or the container C may travel along the second face 71 back to the accumulation area.

Figure 12:
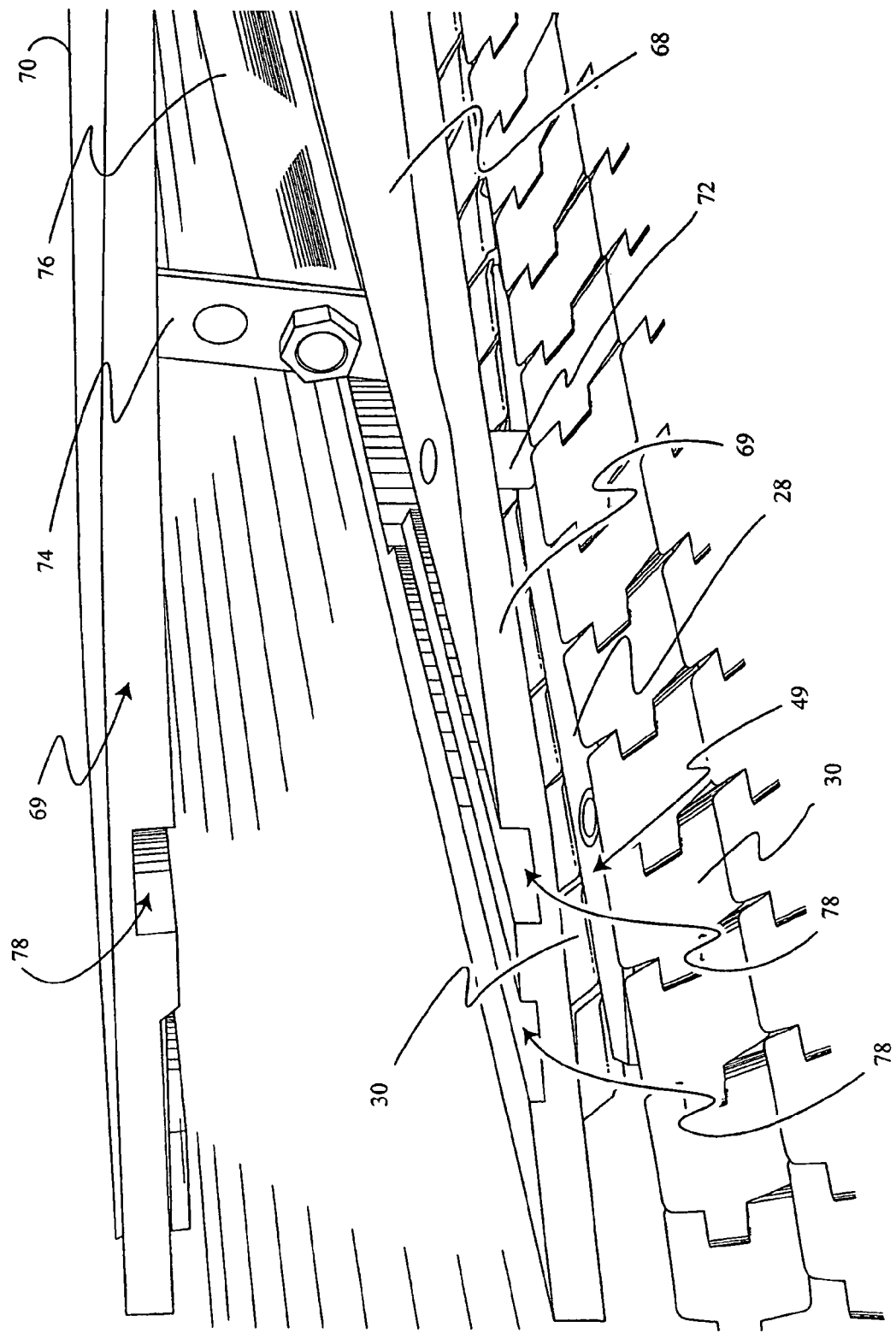
FIG. 12 is a perspective view of the discharge chute guide.

FIG. 12 illustrates a mounting of the second guide 68. In the depicted embodiment, the plug 28 is inserted in the gap 58 between the conveyor chains 30. A spacer mount 72 is mounted directly on top of the plug 28. The second guide 68 is mounted on the spacer mount 72. A bracket 74 is mounted to the second guide 68. The bracket 74 provides a mounting surface for a first actuator 76. The second guide 68 and the third guide 70 include matching grooves 78, which are explained in greater detail below.

Figure 13:
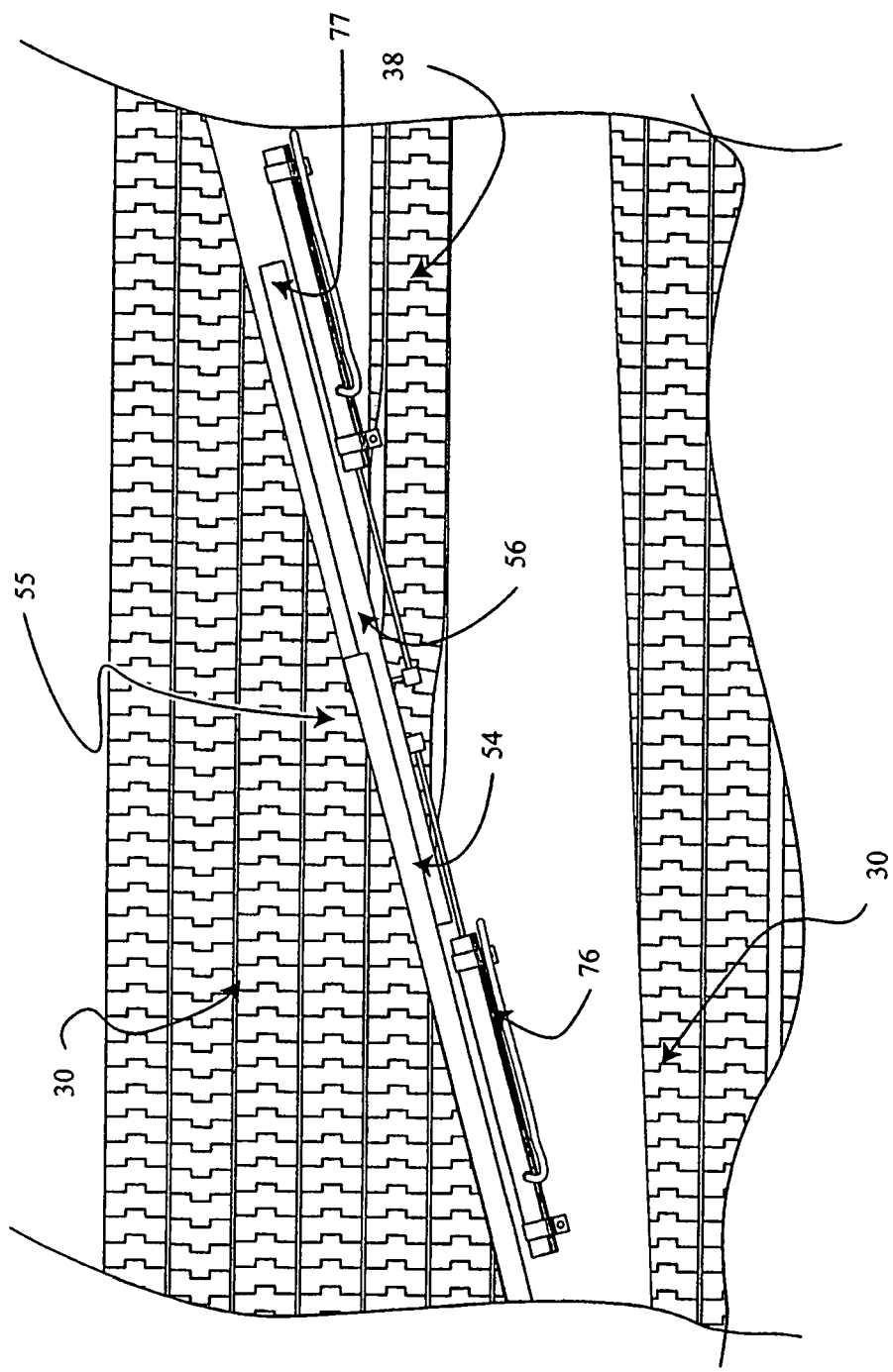
FIG. 13 is a top view of the gate.

FIG. 13 illustrates a gate 55 which is located adjacent to the discharge chute 38. The gate 55 opens and closes depending upon the status of the downstream conveyor 210. For example, if the downstream conveyor 210 is full and containers C are not moving on the downstream conveyor 210, then the gate is closed, but if the downstream conveyor 210 is carrying containers C then the gate remains open. The gate 55 has two portions: a first sliding member 54 and a second siding member 56. The first and second sliding members 54, 56 overlap one another to close the gate and prevent containers C from traveling through the discharge chute 38. In the depicted embodiment, the first actuator 76 operates the first sliding gate 54 and a second actuator 77 operates the second sliding gate 56. The first and second actuators 54, 56 may be pneumatic, hydraulic, or electromechanical. In the depicted embodiments, the actuators 54, 56 are pneumatic.

The first and second sliding members 54, 56 are angled relative to the path of the chains. In the depicted embodiment, the first and second sliding members 54, 56 are angled at about 15 degrees, which is also the angle of the guides 60, 68, 70 in this area. If the containers C have to be re-circulated due to a downstream stop, the first sliding member 54 is closed. Movement of the first sliding member 54 follows the direction of travel of the containers C and travels essentially at the same speed as the containers C. In this manner, the containers C are gently diverted onto the re-circulation area of the accumulation table 10.

After the first sliding member 54 has closed, the second sliding member 56 is activated and slides in a direction opposite that of the first sliding member 54. Once the second sliding member 56 is in place, the first sliding member 54 is retracted. The containers C continue to be re-circulated by the second sliding member 56.

Once the downstream machine 200 is back in production, the second sliding member 56 is opened. The second sliding member 56 is used to open the discharge chute 38 in the same way it was closed, i.e. by following the direction of travel of the containers C. Movement of the second sliding member 56 follows the direction of travel of the containers C and travels essentially at the same speed as the containers C. As such, the containers C in contact with the second sliding member 56 continue onto the re-circulation area of the accumulation table 10 and thereafter containers C are free to enter the discharge chute 38 without causing container instability. The stability ensured by the dual member gate 55 significantly reduces the chance of containers C falling over and jamming the discharge chute 38.

Referring once again to FIG. 11, the slots 64 are constructed and arranged to provide a proper orientation of the adjustment member 62 relative to the gate 55. In other words, the adjustment member 62 may be moved and adjusted to provide the appropriate width of the discharge chute 38 while at the same time maintaining a proper spacing along the gate 55.

Figure 14:
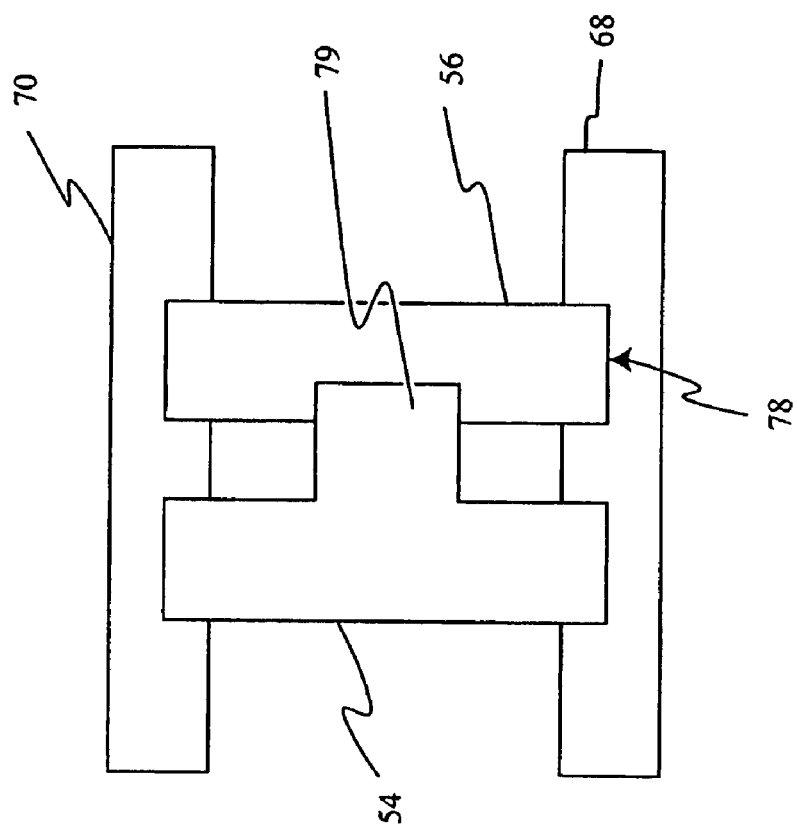
FIG. 14 is a sectional view of the gate members.

FIG. 14 illustrates the first sliding member 54 and the second sliding member 56 relative to one another. As noted above, the first sliding member 54 and the second sliding member 56 are moved by actuators 76, 77 to form the gate 55. In the depicted embodiment, the second sliding member 56 moves in and out of the grooves 78 (best seen in FIG. 12). The first sliding member 54 and the second sliding member 56 slide next to one another. In some embodiments, the first sliding member 54 may interconnect with the second sliding member 56 to ensure a smooth operation of the gate 55 upon engagement of one of the actuators 76, 77. For example, the sliding members 54, 56 may have a tongue-and-groove arrangement 79 such that the sliding members 54, 56 lock together yet slide relative to one another.

Figure 15:
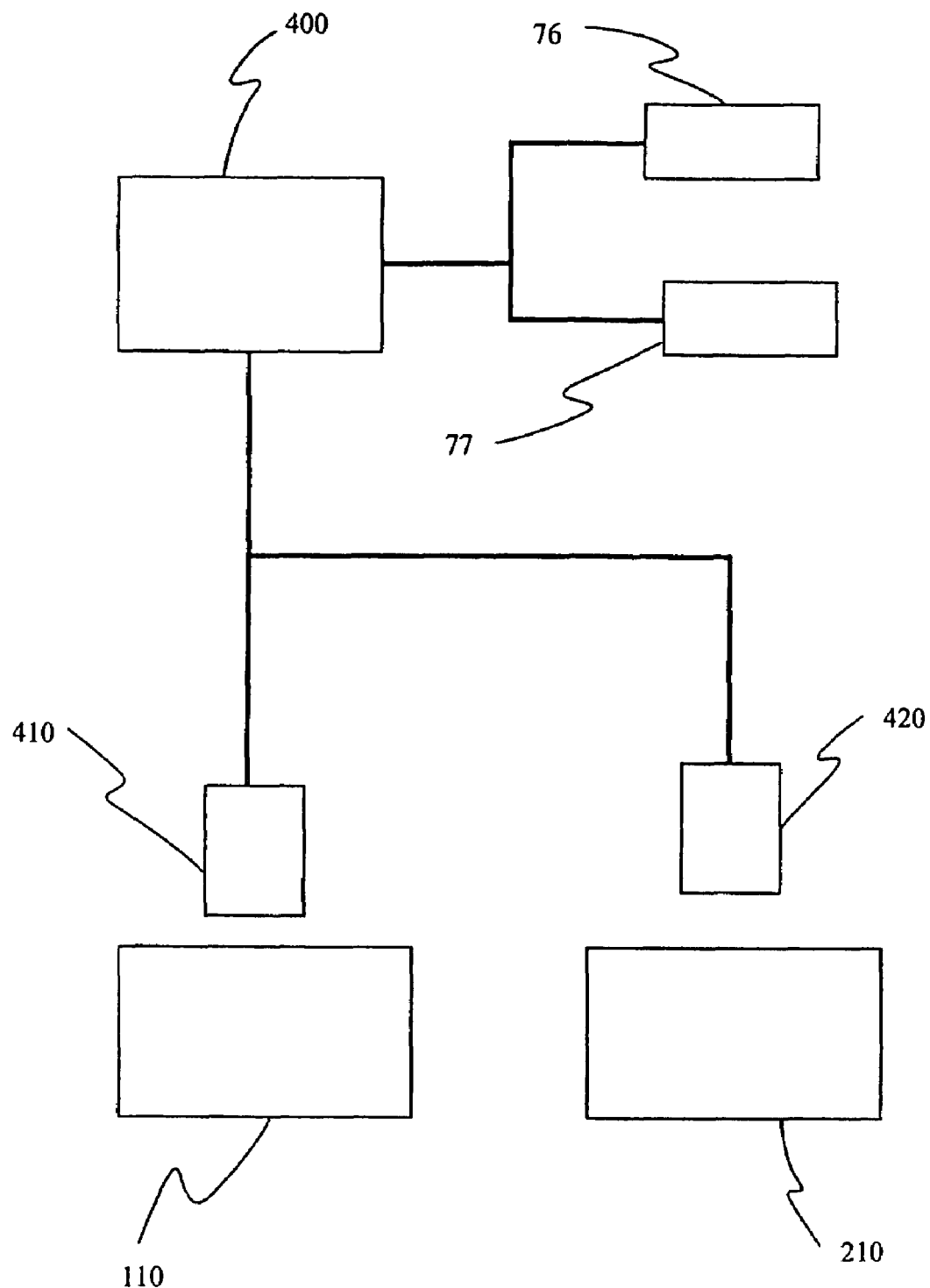
FIG. 15 is a schematic illustrating the controller.

FIG. 15 illustrates schematically a controller 400. The controller 400 is operatively connected to a first sensor 410 and a second sensor 420. As an example, the first sensor 410 and the second sensor 420 may be light sensors. The sensors 410, 420 respectively sense the upstream conveyor 110 and the downstream conveyor 210. For example, the second sensor 420 may detect whether or not containers C are moving on the downstream conveyor 210. The sensors 410, 420 send a signal back to the controller 400. In response to this signal, the controller 400 may engage or disengage the first actuator 76 or the second actuator 77.

Figure 16:
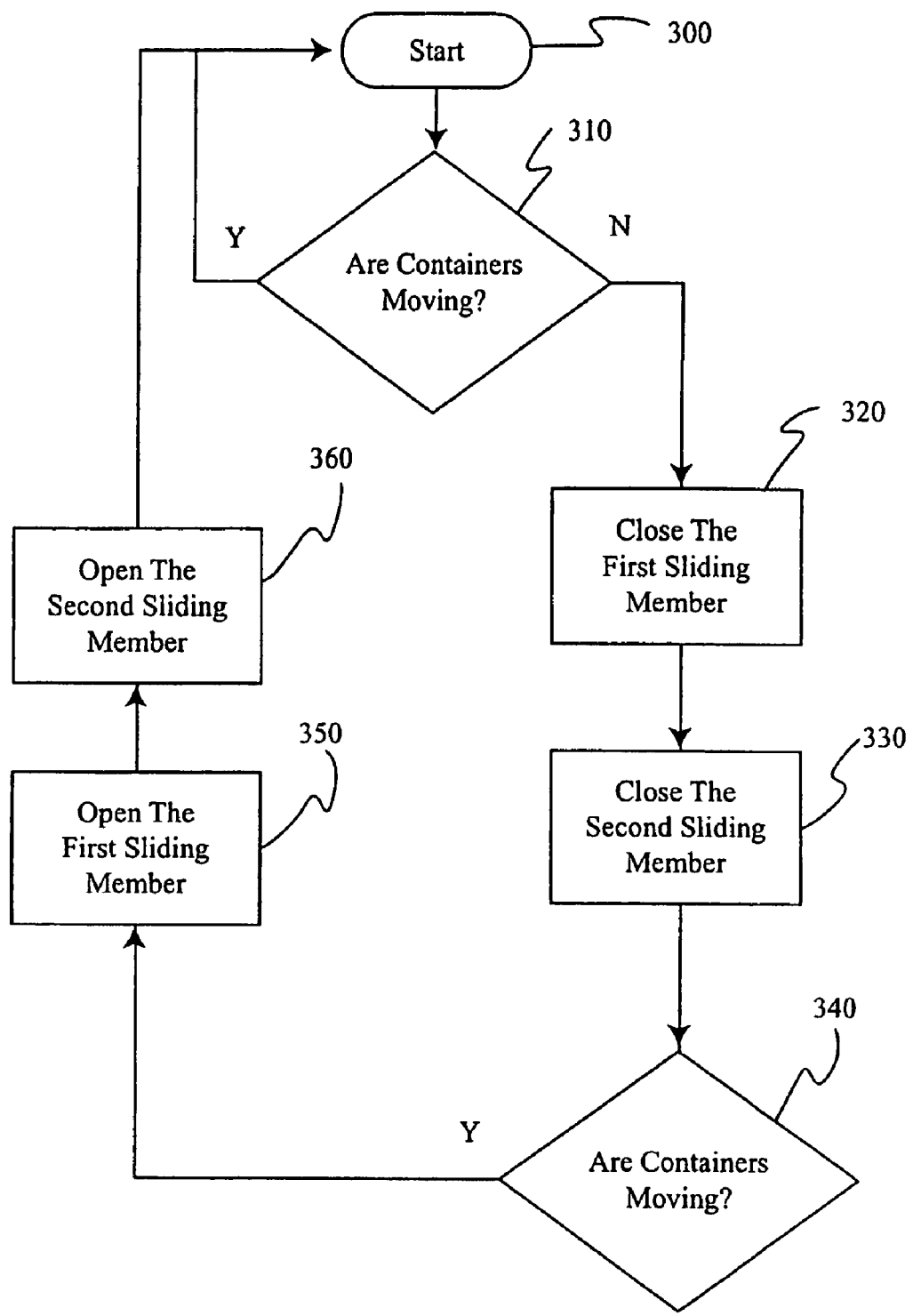
FIG. 16 is a flowchart illustrating the steps of the control program.

FIG. 16 illustrates the steps involved in operating the gate 55 of the discharge chute 38. The steps began at a start position, also known as an initial position, 300. There is a first decision 310 in which a controller 400 inquires whether containers C are moving on the downstream conveyor 210. If the containers C are moving, the controller 400 goes back to the start position 300. If the containers C are not moving on the downstream conveyor 210, for example if the downstream machine 200 is inoperative, then the controller 400 engages the first actuator 76 to close the first sliding member 54 in the first step 320. After the sliding member 54 is moved into position, then no more containers C will travel through the discharge chute 38. In the second step 330, the controller 400 engages the second actuator 77 to close the second sliding member 56. In a decision 340, the controller 400 again inquires whether containers C are moving on the downstream conveyor 210. If the containers C are still not moving then the controller 400 takes no action. However, if the containers C are moving in step 350 the controller 400 disengages the first actuator 76 to open the first sliding member 54. In some embodiments, the controller 400 will perform step 350 prior to step 340 so that all will be necessary is to actuate the second actuator 77 in a subsequent step upon an affirmative decision in step 340. In a subsequent step 360, the controller 400 engages the second actuator 77 to open the second sliding member 56. Thereafter, the controller 400 returns to the start position 300 to begin the process again. The process repeats until the accumulation table 10 is powered down.

Referring once again to FIG. 1, in operation, containers C travel on the upstream conveyor 110. The containers C are transferred from the upstream conveyor 110 to the first conveyor 40 by the first guide 80. The containers C travel on the first conveyor 40 in a first direction DR1. The containers C are transferred from the first conveyor 40 to the second conveyor 42 by the second guide 82. The containers C continue to travel in the first direction DR1. The containers C travel around the arcuate section 43 of the second conveyor 42. The third guide 84 ensures that the containers C do not fall off the second conveyor 42. The containers C travel along the second conveyor 42 in a second direction DR2 until reaching the fourth guide 88. If the containers C are near the discharge chute 38 and if the gate 55 is open, containers C traveling along the fourth guide 88 enter the discharge chute 38. Once in the discharge chute 38, the containers are transferred onto the down stream conveyor 210. However, if the containers C are not near the discharge chute 38 or if the gate 55 is closed, then the containers C are transferred onto the first conveyor 40. The containers C continue to travel in the second direction DR2. Thereafter, the containers C re-circulate by traveling around the arcuate section 43 of the second conveyor 42 and begin the process again.

A method of assembling the accumulation table is also provided. The method includes the steps of: providing a frame having a top and a bottom; connecting several spacers to the top of the frame; connecting several track sections to the spacers; connecting several wear strips to the track sections; longitudinally connecting several non-linear tracks to the track sections; placing several conveyor chains in sliding contact with the wear strips to form a first conveyor, the first conveyor having a first straight section, a second straight section, a C-shaped product carrying section located on the top of the frame, and a C-shaped return section located on the bottom of the frame; placing several conveyor chains in sliding contact with the wear strips to form a second conveyor, the second conveyor having a third straight section, a fourth straight section, a C-shaped product carrying section located on the top of the frame, and a C-shaped return section located on the bottom of the frame, the fourth straight section of the second conveyor located adjacent to the first straight section of the first conveyor; and connecting an adjustable discharge chute to the frame, the adjustable discharge chute including a first guide and an adjustment member movable relative to the first guide. An optional step may include locating a plug intermediate at least two conveyor chains and proximate to the non-linear tracks. A further optional step may include mounting the plug to the track section.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A modular accumulation table comprising:
   a. a first section having a first end and a second end opposite said first end, said first section having straight frame portions, said straight frame portions having a top and a bottom, a plurality of spacers mounted on said top of said straight frame portions, and a plurality of tracks mounted to said plurality of spacers;
   b. a second section comprising an arcuate frame portion, said second section mounted adjacent to said first section at said first end, said arcuate frame portion having a top and a bottom, a plurality of spacers mounted to said top of said arcuate frame portion, and a plurality of arcuate tracks mounted to said plurality of spacers;
   c. a third section comprising an arcuate frame portion, said third section mounted adjacent to said first section at said second end, said arcuate frame portion having a top and a bottom, a plurality of spacers mounted to said top of said arcuate frame portion, and a plurality of arcuate tracks mounted to said plurality of spacers;
   d. at least one other section adapted for mounting intermediate said first section and said third, said other section having a plurality of tracks; and
   e. product conveying chains mounted within the tracks of all said sections.

2. The modular accumulation table according to claim 1 wherein the first section, second section, third section, and said at least one other section are aligned to form a continuously operable product conveyor and accumulation system.

3. A modular accumulation table comprising:
   a. a first modular section having a first end and a second end opposite said first end, said first section having opposing straight sides and a plurality of tracks extending the length of the section;
   b. an arcuate shaped second modular section, said second section mounted adjacent to said first section at said first end, said second section having a plurality of tracks extending the length of the section, said tracks being aligned with the tracks of the first section;
   c. an arcuate shaped third modular section, said third section mounted adjacent to said first section at said second end, said third section having a plurality of tracks extending the length of the section, said tracks being aligned with the tracks of the first section;
   d. at least one other modular section adapted for mounting intermediate said first section and said second section, said other section having a plurality of tracks; and
   e. product conveying claims mounted within the tracks of all said sections.

4. The modular accumulation table as in claim 3 wherein the first section, second section, third section, and said at least one other section are aligned to form a continuously operable product conveyor and accumulation system.

* * * * *